United States Patent
Schmit

(10) Patent No.: US 8,687,702 B2
(45) Date of Patent: Apr. 1, 2014

(54) REMOTE TRANSMISSION AND DISPLAY OF VIDEO DATA USING STANDARD H.264-BASED VIDEO CODECS

(75) Inventor: Michael L. Schmit, Cupertino, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1274 days.

(21) Appl. No.: 12/259,236

(22) Filed: Oct. 27, 2008

(65) Prior Publication Data
US 2010/0104021 A1 Apr. 29, 2010

(51) Int. Cl.
H04N 7/12 (2006.01)
H04N 7/26 (2006.01)

(52) U.S. Cl.
CPC ... H04N 19/00151 (2013.01); H04N 19/00903 (2013.01)
USPC .................. 375/240.24; 375/240; 375/240.01

(58) Field of Classification Search
CPC .................. H04N 19/00151; H04N 19/00903
USPC ................................ 375/240.24, 240, 240.01
See application file for complete search history.

(56) References Cited

U.S. PATENT DOCUMENTS

| | | | | |
|---|---|---|---|---|
| 7,061,410 B1* | 6/2006 | Pearson et al. | ................ | 341/107 |
| 7,062,088 B1* | 6/2006 | Clauson | ........................ | 382/166 |
| 7,310,371 B2* | 12/2007 | Cote et al. | ................ | 375/240.15 |
| 7,362,804 B2* | 4/2008 | Novotny et al. | ......... | 375/240.01 |
| 7,397,853 B2* | 7/2008 | Kwon et al. | ............. | 375/240.03 |
| 7,443,318 B2* | 10/2008 | Hung et al. | ..................... | 341/51 |
| 7,492,387 B2* | 2/2009 | Yang et al. | ................. | 348/14.09 |
| 7,498,960 B2* | 3/2009 | Wilson et al. | ................. | 341/106 |
| 7,525,459 B2* | 4/2009 | Stein et al. | ..................... | 341/106 |
| 7,539,346 B2* | 5/2009 | Kang | ............................. | 382/233 |
| 7,620,103 B2* | 11/2009 | Cote et al. | ................ | 375/240.03 |
| 7,646,318 B2* | 1/2010 | Lee et al. | ......................... | 341/67 |
| 7,764,738 B2* | 7/2010 | Kim et al. | ................ | 375/240.12 |
| 7,778,327 B2* | 8/2010 | Zhou | ........................ | 375/240.03 |
| 7,848,407 B2* | 12/2010 | Yoon | ........................ | 375/240.01 |
| 7,881,384 B2* | 2/2011 | Cote et al. | ................ | 375/240.16 |
| 7,903,119 B2* | 3/2011 | Hochmuth et al. | ........... | 345/522 |
| 7,912,127 B2* | 3/2011 | Joch et al. | ................ | 375/240.16 |
| 8,005,140 B2* | 8/2011 | Yang et al. | ............... | 375/240.03 |
| 8,009,734 B2* | 8/2011 | Cote et al. | ................ | 375/240.15 |
| 8,059,717 B2* | 11/2011 | Saigo et al. | ............... | 375/240.12 |
| 8,089,892 B2* | 1/2012 | Liu et al. | ....................... | 370/252 |
| 8,090,019 B2* | 1/2012 | Guo et al. | ................ | 375/240.12 |
| 8,116,379 B2* | 2/2012 | Dang | ........................ | 375/240.24 |
| 2004/0240549 A1* | 12/2004 | Cote et al. | ................ | 375/240.15 |
| 2005/0123282 A1* | 6/2005 | Novotny et al. | ............. | 386/111 |

(Continued)

Primary Examiner — Bradley Holder
(74) Attorney, Agent, or Firm — Volpe and Koenig, P.C.

(57) ABSTRACT

Embodiments include implementing a remote display system (either wired or wireless) using a standard, non-custom codec. In this system, the decoder side can be fully implemented using an existing standard from a decode/display point of view and using a single stream type. The encoder side includes a pre-processing component that analyzes screen images comprising the video data to determine an amount of difference between consecutive frames of the screen images, divides each screen image into a plurality of regions, including no change regions, high quality regions, and low quality regions. The pre-processor characterizes each region as requiring a minimum quality level, encodes the low quality regions for compression in accordance with the H.264 encoding standard; and encodes the high quality regions using the lossless compression scheme of the H.264 standard. A no change region is encoded using a version of the H.264 encoding standard that adaptively and dynamically selects between lossless and lossy compression in a manner that optimizes efficiency of the compression operation.

12 Claims, 7 Drawing Sheets

(56) References Cited

U.S. PATENT DOCUMENTS

| | | | |
|---|---|---|---|
| 2005/0185045 A1* | 8/2005 | Kamariotis | 348/14.12 |
| 2005/0231588 A1* | 10/2005 | Yang et al. | 348/14.08 |
| 2005/0243911 A1* | 11/2005 | Kwon et al. | 375/240.03 |
| 2006/0093230 A1* | 5/2006 | Hochmuth et al. | 382/239 |
| 2007/0025444 A1* | 2/2007 | Okada et al. | 375/240.16 |
| 2008/0025392 A1* | 1/2008 | Lee et al. | 375/240.03 |
| 2008/0159387 A1* | 7/2008 | Dvir et al. | 375/240.03 |
| 2008/0165861 A1* | 7/2008 | Wen et al. | 375/240.26 |
| 2008/0212886 A1* | 9/2008 | Ishii et al. | 382/239 |
| 2009/0010557 A1* | 1/2009 | Zheng et al. | 382/239 |
| 2009/0022403 A1* | 1/2009 | Takamori et al. | 382/195 |
| 2009/0092326 A1* | 4/2009 | Fukuhara et al. | 382/233 |

* cited by examiner

500

| REGION TYPE | EFFECT | COMPRESSION METHOD |
|---|---|---|
| Static 502 | most pixels stay the same | Adapted H.264 |
| In Motion 504 | most pixels change | Standard H.264 |
| Scrolling 506 | pixels change by a fixed amount | Adapted H.264 |
| Scene Change 508 | all pixels change | Adapted H.264 |

FIG. 5

REMOTE TRANSMISSION AND DISPLAY OF VIDEO DATA USING STANDARD H.264-BASED VIDEO CODECS

TECHNICAL FIELD

The disclosed embodiments relate generally to video display technology, and more specifically to methods and systems for remotely displaying video.

BACKGROUND OF THE DISCLOSURE

The remote display of video data using consumer electronics devices has become a field of significant development. For example, the High-Definition Multimedia Interface (HDMI) standard was developed to define a compact audio/video connector interface for transmitting uncompressed digital streams, and WirelessHD has become an industry-led effort to define a specification for the next generation wireless digital network interface specification for wireless high-definition signal transmission for consumer electronics products. These systems allow devices, such as computers, mobile phones, digital cameras and similar consumer devices to become transmitters of video data for display through a display device such as a high-definition television (HDTV), video projector, or similar device.

To reduce the amount of data transmitted in video systems, the data is often compressed through a coding scheme. A video codec is a device or firmware/software program that enables video compression and/or decompression for digital video. The compression usually employs lossy data compression in which a much smaller compressed file is produced compared to a lossless compression method. The two basic lossy compression schemes use transform codecs or predictive codecs. In lossy transform codecs, samples of picture or sound are taken, chopped into small segments, transformed into a new basis space, and quantized. The resulting quantized values are then entropy coded. In lossy predictive codecs, previous and/or subsequent decoded data is used to predict the current sound sample or image frame. The error between the predicted data and the real data, together with any extra information needed to reproduce the prediction, is then quantized and coded. Lossy methods are most often used for compressing sound, images or videos, but lossless compression is typically required for text. Lossless compression is used when it is important that the original and the decompressed data be identical, or when no assumption can be made on whether certain deviation is uncritical. Typical examples are executable programs and source code. Some image file formats (e.g., PNG or GIF) use only lossless compression, while others (e.g., TIFF and MNG) may use either lossless or lossy methods.

The implementation of remote display systems using existing technology under present systems generally requires the development and use of proprietary coding and decoding schemes through one or more codec devices. Typical systems may combine multiple codecs or require the design of a non-standard codec. This requires increased development efforts and results in systems that are largely proprietary in terms of design and compatibility with other systems.

What is desired, therefore, is a remote display system that utilizes known or industry standard codec devices to reduce development costs and facilitate compatibility in deployment.

BRIEF DESCRIPTION OF THE DRAWINGS

Embodiments are illustrated by way of example and not limitation in the figures of the accompanying drawings, in which like references indicate similar elements and in which:

FIG. 5 is a table that illustrates the different types of defined regions of a screen image and corresponding compression schemes, under an embodiment.

DETAILED DESCRIPTION

Embodiments of the invention as described herein provide a solution to the problems of conventional methods as stated above. In the following description, various examples are given for illustration, but none are intended to be limiting. Embodiments include implementing a remote display system (either wired or wireless) using a standard, non-custom codec. In this system, the decoder side can be fully implemented using an existing standard from a decode/display point of view and using a single stream type. The encoder side includes a pre-processing component that analyzes screen images comprising the video data to determine an amount of difference between consecutive frames of the screen images, divides each screen image into a plurality of regions, including no change regions, high quality regions, and low quality regions. The pre-processor characterizes each region as requiring a minimum quality level, encodes the low quality regions for compression in accordance with the H.264 encoding standard; and encodes the high quality regions using the lossless compression scheme of the H.264 standard. A no change region is encoded using a version of the H.264 encoding standard that adaptively and dynamically selects between lossless and lossy compression in a manner that optimizes efficiency of the compression operation. This solution greatly eases development efforts and achieves high compression for medium/high motion time periods at low bandwidth and with near static screens having lossless compression with low bandwidth. Such a system could be used for in-room remote displays (such as to a HDTV or a projector). Such a system could also be used for remote gaming across the Internet, screen remoting for video conferencing or tech support.

For purposes of this description, "H.264" refers to the standard for video compression that is also known as MPEG-4 Part 10, or MPEG-4 AVC (Advanced Video Coding). H.264 is one of the block-oriented motion-estimation-based codecs developed by the ITU-T Video Coding Experts Group (VCEG) together with the ISO/IEC Moving Picture Experts Group (MPEG).

Figure 1:
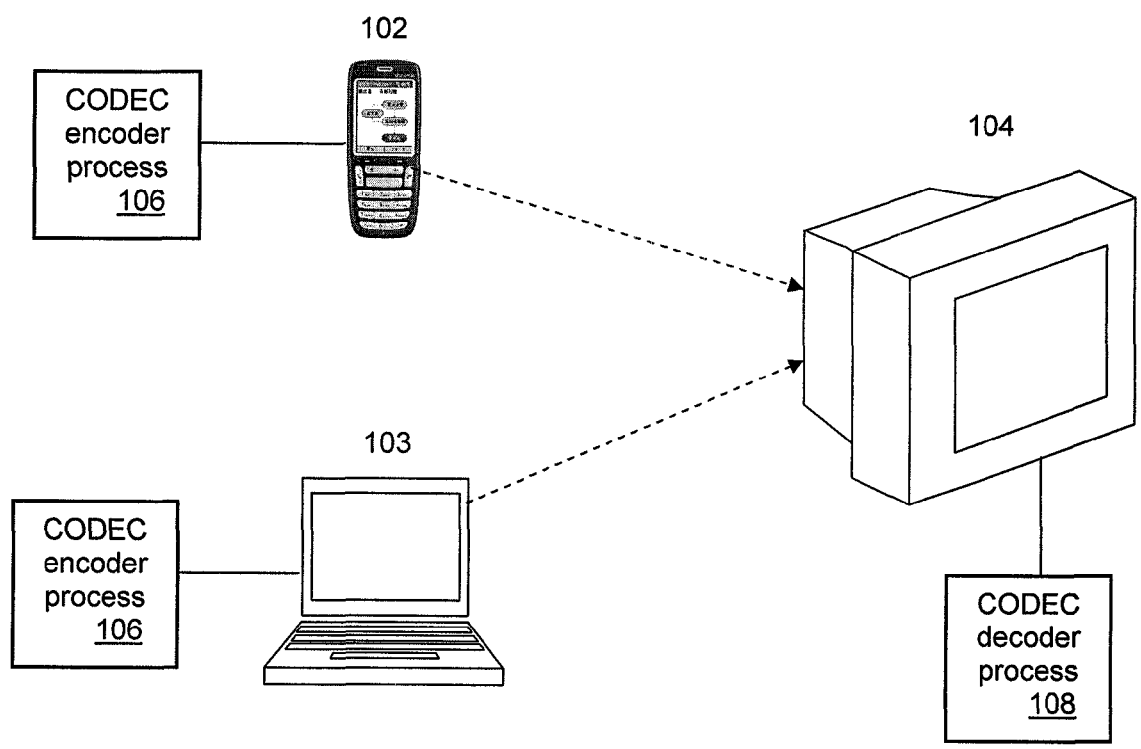
FIG. 1 illustrates a block diagram of a remote display system utilizing a defined codec standard for encoding and decoding streaming video and audio data, under an embodiment.

FIG. 1 illustrates a block diagram of a remote display system utilizing a defined codec standard for encoding and decoding streaming video and audio data, under an embodiment. In system 100, a consumer device such as mobile phone 102 or notebook computer 103 is configured to transmit moving or still video data and/or audio data to a projector or playback device 104. The receiver 104 is configured to receive data from any appropriately configured transmitter 102 or 103. The transceiver circuits between the transmitters and receivers must be compatible in order to ensure proper playback of the transmitted data. In prior systems in which standard consumer devices (e.g., mobile phones) were adapted for use as transmitters, custom codec devices were designed and implemented for use by both the transmitter and receiver devices.

In one embodiment, the transmitter device is a computing device that includes transceiver components for the transmission and reception of digital data, such as multimedia data comprising video, audio, still digital images, and the like. The transmitter may be implemented on any type of computing device or a mobile computing or communication device, such as a notebook computer 103, personal digital assistant (PDA), mobile phone 102, game console, or any computing device with sufficient processing, communication, and control or AV (audiovisual) playback capability. In system 100, the transmitter is coupled, directly or indirectly, to a receiver 104 through one or more networks. Such a network may, for example, comprise the Internet, a Wide Area Network (WAN), a Local Area Network (LAN), or any combination thereof. The receiver 104 may be implemented on any type of computing device capable of receiving and playing back data from the transmitter, such as a computer workstation, video monitor, audio playback unit, and so on.

The transmitter device may be a standard consumer type of electronic device that is adapted or designed specifically to transmit compressed and uncompressed digital data to receiver 104. The transmitter device 102 or 103 includes a codec 106 that has an encoder process that is configured to encode and transmit digital data using a standard data compression scheme. Likewise, receiver 104 includes a codec 108 that has a decoder process that is configured to receive and decode digital data using the same standard data compression scheme.

The codec components 106 and 108 video codec is circuitry or software that enables video compression and decompression for digital video data sent between the transmitter and the receiver. The compression employs lossy data compression that compresses the data by a defined compression ratio to allow an approximation of the original data to be reconstructed, and lossless data compression that use data compression algorithms that to allow the exact original data to be reconstructed from the compressed data. In certain circumstances, the lossless data compression is used as a component within the lossy data compression scheme. In one embodiment, a lossy compression scheme is used when transmitting streaming video for applications, such as full screen video or 3D game play that can be encoded normally, as a conventional video stream with conventional bitrate control, and lossless compression is used for required high quality data, such as static screens with high contrast images or fine text with sharp edges, and the like.

In one embodiment, the codec devices 106 and 108 are based on a standard codec, such as H.264 to transmit screen images from the transmitter 102 or 103 to the remote display of the receiver 108. The H.264 (also known as MPEG-4 Part 10 or MPEG-4 AVC) specification is a standard for video compression, and contains a number of features that allow it to compress video much more effectively than older standards and to provide more flexibility for application to a wide variety of network environments. The H.264 specification provides a provision for sending any individual macroblock of 16×16 pixels as a lossless block with PCM (pulse-code modulation) coding. PCM is a digital representation of an analog signal where the magnitude of the signal is sampled regularly at uniform intervals, then quantized to a series of symbols in a numeric (usually binary) code.

In one embodiment, the receiver codec is designed and configured to implement a standard H.264 compliant decoder process 108. The transmitter codec employs a slightly modified version of the H.264 encoding process 106. In general, the H.264 specification only defines the final output stream and not the process by which it is obtained. Through codecs 106 and 108, the normal H.264 encoding process is adapted slightly to optimize the use of lossy and lossy transmission for the content being transmitted in system 100. The H.264 based codecs 106 and 108 which can be implemented in either software or hardware and included as part of an integral circuit in the respective device 102, 103, or 104, or as a separate circuit from the processing circuitry of these devices.

In MPEG-based video compression systems, the minimum independently encoded rectangle on the frame is called macroblock, and has a size of 16×16 pixels, and each frame has a periodicity of ⅟30 of a second. In normal video processing, every pixel is treated as having equal value. Certain systems perform compression by statistically analyzing the whole frame of 16×16 pixels to determine a level of activity ranging from none or very little activity to much activity. Standard compression systems generally discard pixels that show relatively little activity. For full motion video, this type of analysis is usually adequate to perform compression in which perceptually insignificant information is discarded and human perception is relied upon to fill-in the missing data so that the compressed image appears identical to the original uncompressed version. Text-data, or similar high-contrast images, however, pose a problem for codecs in that the transition from black to white can be on the order of one pixel, and that a page may be static for a period of time so all pixels show no activity, and then totally change so that all pixels show maximum activity at another period of time, such as in a scroll or page change operation. Text content thus results in common problems associated with most present codecs, such as the presence of blocking or ringing artifacts. One solution for such known systems, is to process text data in lossless mode with no compression, such that all pixels are copied. However, this approach can result in relatively high bandwidth requirements and non-optimum compression for mixed media content.

In general, every codec can give a varying degree of quality for a given set of frames within a video sequence. Typically, the quality is controlled through a bitrate control mechanism (bitrate allocation) that sets the bitrate and quality on a per-frame basis. Alternatively, different types of frames such as key frames and non-key frames can be used to control compression. Embodiments provide a modified version of the H.264 specification that analyzes each macroblock of a video sequence using a pre-processing algorithm and transmits certain frames with lossy compression and certain other frames with lossless compression based on certain defined characteristics of the frames. The normal H.264 encoding process is adapted to optimize the use of lossy and lossless transmission. A pre-processing algorithm determines which portions of an image or series of images can be sent using lossy compression, and which should be sent using lossless compression. In one embodiment, static screens with fine text, sharp edges and other high contrast static images are sent using lossless compression, while full-screen video, or 3D game play can be encoded normally, as a conventional bit stream with conventional bitrate control. In this manner, screen images are compressed for transmission based on the quality of the image or different regions of the image.

In one embodiment, the image is analyzed and characterized in terms of quality regions. A region can be characterized as low quality, high quality, or a no change region. Low quality regions are encoded using the normal H.264 (or equivalent) coding methods, while high quality regions are encoded using the lossless option in the H.264 (or equivalent) specification. A no change region is encoded using an implementation of the H.264 encoding standard that adaptively and dynamically selects between lossless and lossy compression in a manner that optimizes efficiency of the compression operation. A no change region has priority in detection over low quality or high quality region. A low quality region may be encoded as no change if all the bits for a frame have been consumed by the high quality or other prior spatial regions.

Figure 2:
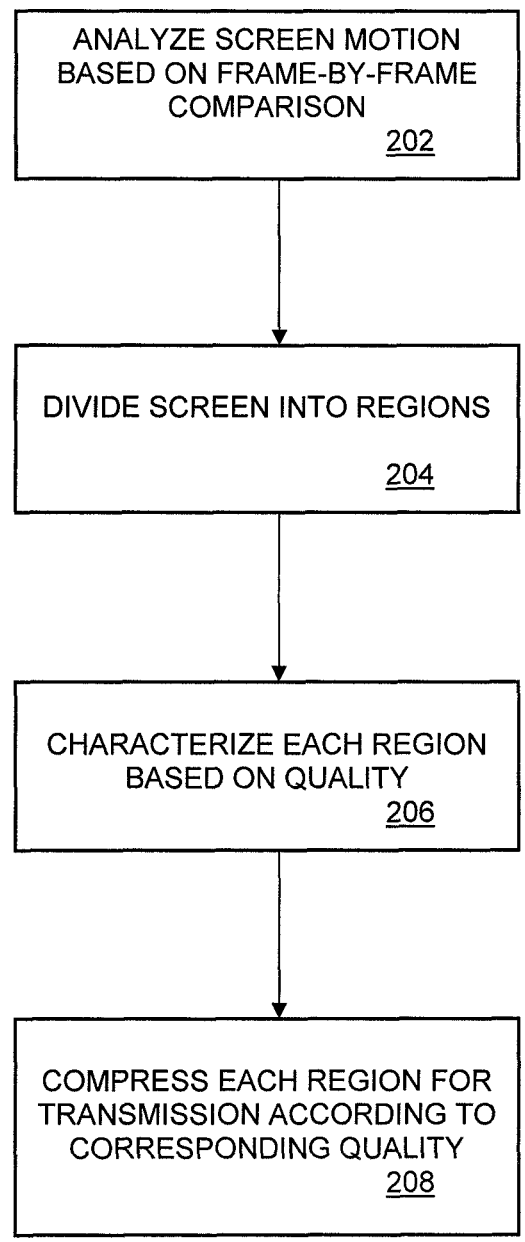
FIG. 2 is a flowchart that illustrates an overall method of transmitting screen images using H.264-based codecs, under an embodiment.

FIG. 2 is a flowchart that illustrates an overall method of transmitting screen images using H.264-based codecs, under an embodiment. In block 202, the screen images are analyzed based on a frame-by-frame comparison. This gives an indication of image motion since a static image will result in little or no variation over a number of consecutive frames, and a moving or dynamic image will have at least some degree of variation over a number of consecutive images. In many cases, different portions of a screen can exhibit different degrees of movement or non-movement. For example, a user interface (UI) screen may be largely static in that most pixels stay the same from frame to frame, except perhaps for certain areas, such as if a clock is displayed and updated periodically in a corner of the UI. Under an embodiment, different regions can be compressed in different ways, depending upon the amount of quality required and/or the amount of movement from frame to frame. Thus, in block 204, the screen is divided into a number of regions. The number of regions generally depends upon the nature of the screen display content (i.e., a largely static UI or a dynamic game program), as well as the constraints and requirements of the processing system. For example, the region organization can be defined in accordance with bandwidth limitations and screen space, and can be controlled by a parameter value that can be set by the user, an application, or other method.

Each region is then characterized with respect to the quality of the image, block 206. In an embodiment, three different regions are defined, no change, low quality, and high quality. A low quality region generally corresponds to an image region in which motion or an inherent lack of detail allows user perception to fill in any deficient information. In this case, a greater degree of compression is allowed. A high quality image generally corresponds to a static, high-contrast image in which any amount of compression may lead to degradation of the image. A high quality region is also referred to as a high contrast or high spatial frequency region, and lossless compression is preferred for such a region. A no change region, or any combination of high and low quality regions is processed using a dynamic combination of lossy and lossless compression. Each region is then compressed in the transmission decoder according to the corresponding quality for transmission to the receiver, block 208. Several discrete degrees of compression may be used along a defined range from no compression (lossless) to maximum compression (lossy).

As stated above, the present H.264 specification includes a provision for sending any individual macroblock of 16×16 pixels as a lossless block with PCM coding. The lossless macroblock coding features of H.264 include a lossless PCM macroblock representation mode in which video data samples are represented directly, allowing perfect representation of specific regions and allowing a strict limit to be placed on the quantity of coded data for each macroblock. An enhanced lossless macroblock representation mode allows perfect representation of specific regions while ordinarily using substantially fewer bits than the PCM mode.

Figure 3:
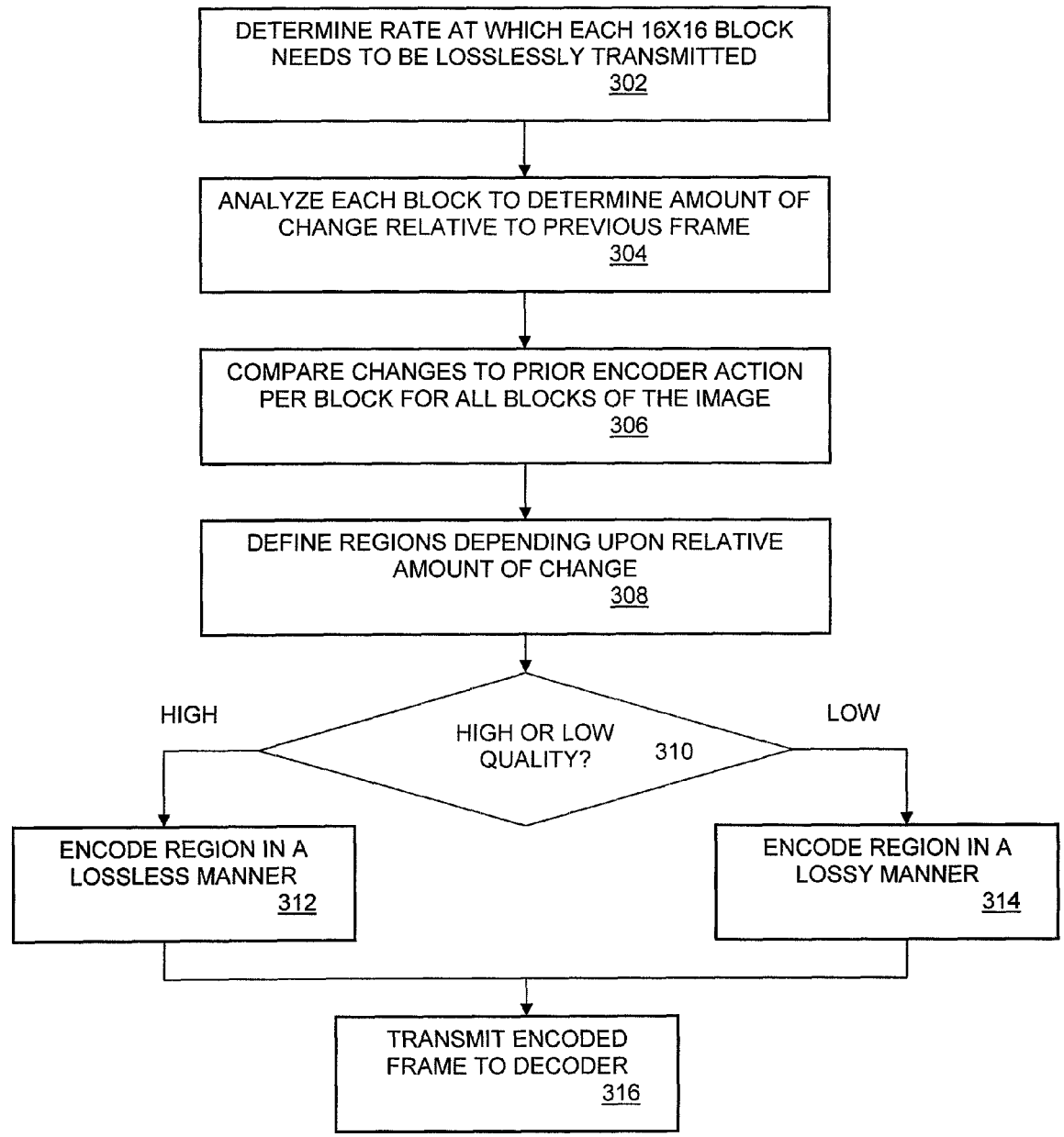
FIG. 3 is a flowchart that illustrates a method of sending screen images as a combination of lossless and lossy compressed blocks, under an embodiment.

FIG. 3 is a flowchart that illustrates a method of sending screen images as a combination of lossless and lossy compressed blocks, under an embodiment. For the illustrated embodiment, a 16×16 macroblock is processed, although it should be noted that other block sizes can also be used. As shown in FIG. 3, the rate at which each 16×16 block on the screen needs to be losslessly transmitted (e.g., once per second) is determined, block 302. This rate can then be altered later, if necessary. The flowchart of FIG. 3 illustrates a process of processing high quality versus low quality regions of an image.

Prior to encoding the screen image, a pre-processor component analyzes each block to determine if it has zero change, some change or a large amount of change from the previous frame, block 304. This may be performed by a motion estimation process in the transmitter codec which produces motion vectors for the image. Frames that do not change at all from frame-to-frame can be skipped. The amount of change is then compared against prior encoder actions for all blocks of the image, 306. The results of the comparison and a set of hints, per block are injected into the encoder. This allows the encoder to encode some small section, per frame, in a lossless manner (with high bits per block), while no motion blocks can be encoded as skipped (very low bits per block). This is represented in FIG. 3 as block 308 in which regions of the image are defined depending upon the relative amount of change within the region from frame-to-frame. In block 310, the pre-processor determines whether the amount of quality required based on the amount of change for each region from frame-to-frame. If the region is a high quality region, then it is encoded in a lossless, or near lossless manner, block 312; and if the region is a low quality region, then it is encoded using some degree of lossy compression, block 314. The frame or frames of the region image are then transmitted to the receiver for decoding in the receiver codec, block 316. A no change or combination high/low quality region is processed using a combination of lossy and lossless, as described below.

For the embodiment of FIG. 3, the pre-processing component analyzes the screen motion to divide the screen into regions and directs the encoder to compress one high-quality region at a time, in turn, at very high quality. If the pre-processing component determines that there are a large number of blocks with large motion then, the entire frame can be encoded conventionally. When the motion stops, however, such as on a spreadsheet or word processing document, each region will, in time, be encoded losslessly, and then remain the same through skipped no motion blocks.

Different degrees of compression can be provided, in addition to a pure lossless or pure lossy compression choice. In this case, an intermediate mode compression mode is provided that provides a medium quality at a rate that is faster then the rate at which a perfect quality can be delivered. In many cases, the speed of transmission is as important, if not more important than the quality. For this embodiment, a user controlled parameter is used to set the amount of quality versus the transmission speed to allow the user to dictate the transmission speed relative to the image quality.

In one embodiment, the hint provided to the encoder dictates the amount of quality required. In some cases, a high quality region is encoded using strictly lossless (no compression) mode. Alternatively, the lossless mode of the encoder may provide some degree of loss to provide very high, but not perfect, quality. This is suitable when absolute quality is not required, but transmission speed or bandwidth limitations are a higher priority. In this embodiment, a quantization parameter is used for the hinted high quality blocks per frame.

For many types of transmitted video images, such as those that are not full screen video clips, many portions of a screen may not have any motion at all. For example, a user interface with only one or two dynamic components, such as a cursor or clock. In other cases, large portions of a screen may change, but only a small portion of the changing screen is of interest to a viewer, for example, a scrolling page of text in which the viewer is only reading one line at a time. In one embodiment, the encoder pre-processing method includes a motion analyzer component that determines which blocks in a screen have no motion from one frame to the next for a defined set of frames. A motion estimation step is performed to generate a motion vector that is used to generate a map of the screen to indicate which regions have motion and which regions do not. In one embodiment, a differencing process is used to determine how many macroblocks are the same within a defined period of time. A threshold value (e.g., 90%) is used to define the minimum amount of identity required to indicate no change for a macroblock. Thus, for example, if 90% of the macroblocks of an image are the same for the time period, the macroblocks are encoded as no-change regions. In the case where a page is being scrolled (left/right or up/down) or changed in some uniform manner, the all of motion vectors will generally indicate the same amount of change. In this case, the codecs are typically configured to encode these regions with some degree of compression, with the regions at the edges of the screen, with new information, encoded with lossless compression.

Figure 4:
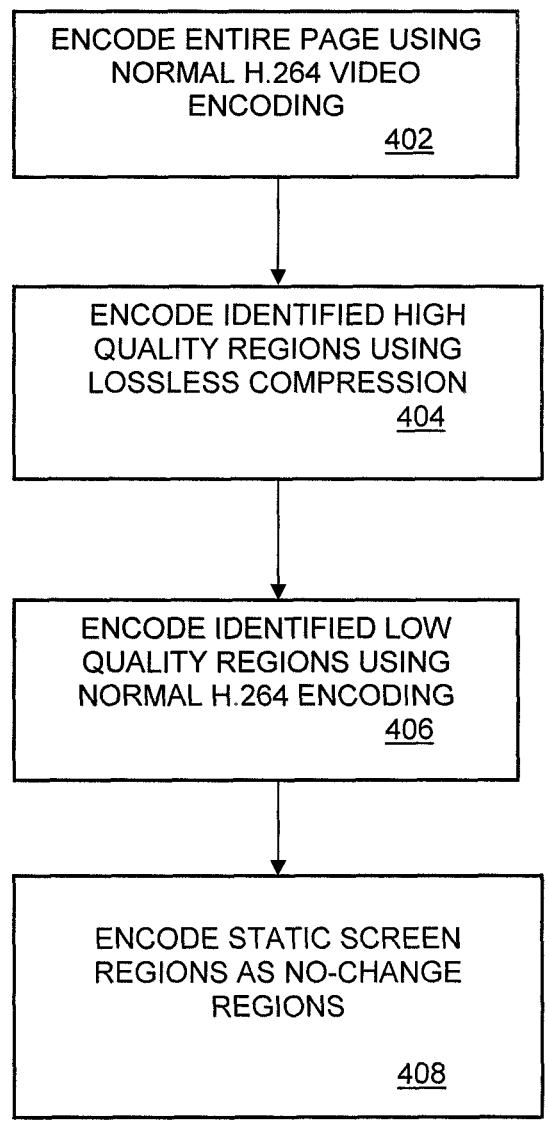
FIG. 4 is a flowchart that illustrates processing in standard H.264 and lossless compression, under an embodiment.

The use of the motion vectors allows the pre-processor encoding process to switch between regular H.264 encoding and lossless compression based on the content of the video clip. FIG. 4 is a flowchart that illustrates processing in standard H.264 and lossless compression, under an embodiment. At a particular start point, such as when a video image is first loaded, an initialization step is performed in which the entire page is encoded using normal H.264 encoding, block 402. After the initialization step, one or more regions of the screen are sequentially encoded losslessly over time. During this sequence, low and high quality regions are then defined, as described with reference to FIG. 3. The high quality regions are then encoded in a lossless manner, block 404, and the low quality regions are encoded using normal H.264 encoding, block 406. For images that include regions that are constantly being updated, the regions of motion are encoded losslessly, while the remaining regions are encoded as no-change regions, block 408. Such no change regions may be assigned a motion vector of value zero by the motion estimation process.

In certain cases, only specific areas of a screen may be of interest to the viewer despite the fact that other regions of the screen may be exhibiting some degree of change. An example of this is the area around the cursor of a text document. In this case, only the region of interest is encoded as lossless. For this embodiment, the pre-processor may utilize a function of the video encoder that interfaces with the graphics processor to determine where the cursor or other reference object is located within a screen display. An amount of screen space around the cursor (e.g., ±5% of the screen) to be encoded lossless may be defined by a set parameter value, or by a user defined value.

FIG. 5 is a table that illustrates the different types of defined regions of a screen image and corresponding compression schemes, under an embodiment. As shown in table 500, the possible states of change between frames of include: mostly static where most pixels between consecutive frames stay exactly the same; mostly in motion, such as in normal full screen video or for a static display where there may be motion effects, such as slight camera jitter; mostly scrolling, such as when doing typical navigation around an image; and scene change, in which all or nearly all pixels are different between consecutive frames, such as when a new page is first displayed.

The number of pixels that change versus remain the same to define a no change region can be defined by the user or application, or it can be a strictly defined parameter, and may be represented as a fraction or percentage of a page or defined area, or similar measure. For example, a no change region may be defined as on in which no more than 2% of the pixels change between any two consecutive frames.

The state of change between consecutive frames in a processed video clip can also include some identifiable combination of these changes. Some of these detected states would have a frame or more of hysteresis to prevent flip-flopping. It should be noted that a scene change region would generally not include any hysteresis frames.

As shown in FIG. 5, if the image is mostly in motion 504, the regions of the image are encoded using normal H.264 encoding. For all other types of regions, an adapted H.264 encoding method is used. For this method, the pre-processor includes a bitrate allocation component that is controlled or clamped by the user or the maximum bandwidth available on the physical link. Since bitrate control is not explicitly part of the H.264 standard, the adapted H.264 method under an embodiment allows for the definition of bitrate control in accordance with the image processing method. The bitrate allocation can be configured to change dynamically, and can be based on the detected state of the screen image.

Figure 6:
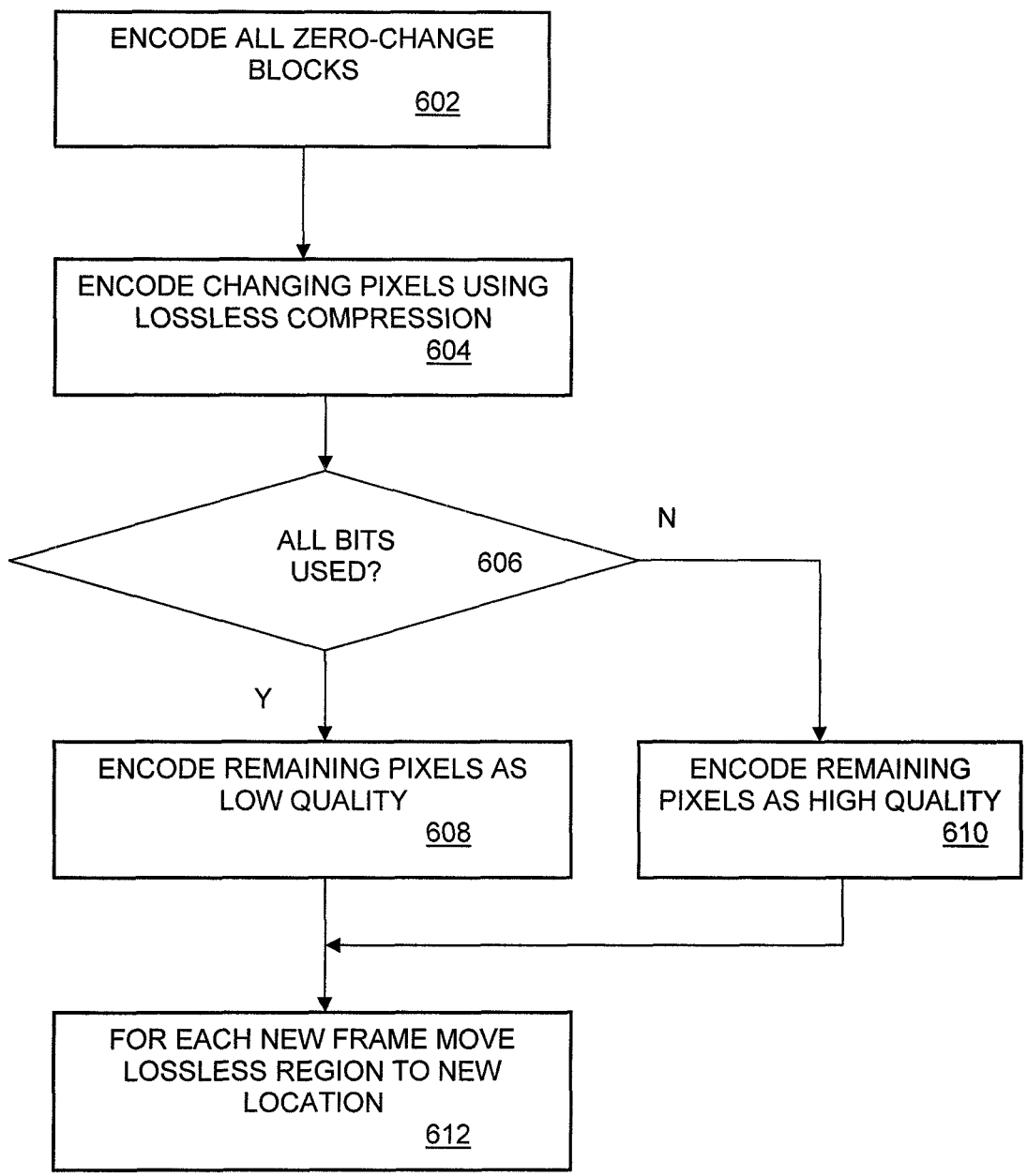
FIG. 6 is a flowchart that illustrates a method of allocating bits for in an adapted H.264 encoding scheme, under an embodiment.

FIG. 6 is a flowchart that illustrates a method of allocating bits for in an adapted H.264 encoding scheme, under an embodiment. As shown in block 602, all zero-change blocks are encoded first. Any remaining bits are used to encode all changing pixels with lossless compression, block 604. In block 606 it is determined whether or not all of the allocation bits have been used. If the lossless encoding consumes all of the allocated bits, the remaining pixels are encoded as low quality, block 608, otherwise they can be encoded as high quality, block 610. The system keeps track of which regions use which encoding method. On each new frame the process moves the lossless region to a new spatial location, block 612.

For an image that is mostly scrolling 506, all zero-change blocks are encoded first. The process then identifies the rectangular scrolling region and performs a large-block motion search that finds vertical or horizontally scrolling. The blocks of this region are encoded with near uniform motion vectors. The remaining blocks are then encoded using the adapted H.264 encoding method of FIG. 6.

In the case of a scene change 508, the process first discards any hysteresis and spatial allocation data and performs the adapted H.264 encoding method of FIG. 6.

Certain images may represent a combination of static, motion, and scrolling regions. In this case, the system first finds recognizable rectangular screen regions that conform to one of the specific region types, static 502, in motion 504, or scrolling 506. Each respective region is then processed in accordance with the corresponding adapted H.264 encoding method. In certain cases, a sub-region may exhibit more than one region type, and further decomposition into a discrete type may not be feasible. In this case, a single region type is selected for the region, with the default selected region type being an in motion 504 region. Any other type of region may be defined as the default region type, depending upon implementation. The process of defining sub regions can sometimes be aided by use of driver level knowledge of how the operating system constructs the final screen image.

Figure 7:
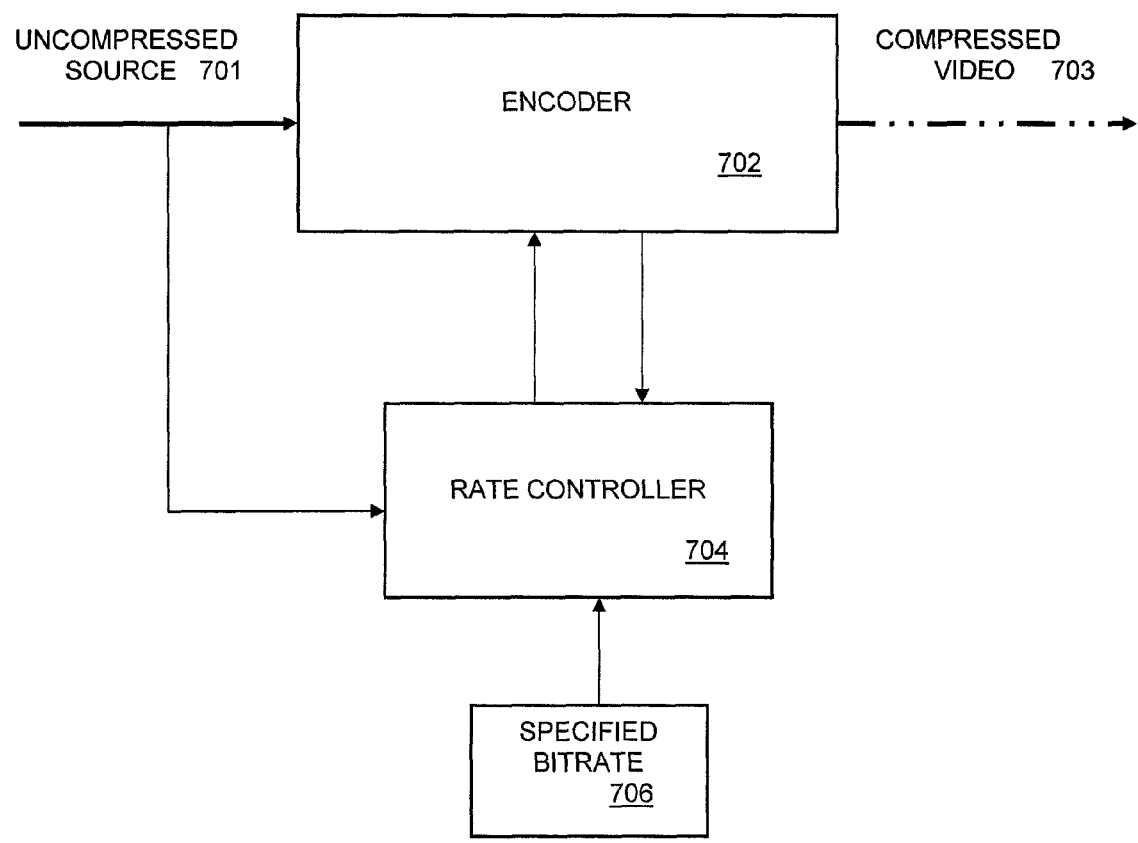
FIG. 7 illustrates a rate controller component for use in a bitrate allocation method, under an embodiment.

In one embodiment, the bitrate allocation method is implemented through a rate control component. FIG. 7 illustrates a rate controller component for use in a bitrate allocation method, under an embodiment. As shown in system 700, an encoder 702 receives uncompressed video data 701 from a source and produces a compressed video signal 703 in accordance with an encoding method, such as standard H.264 encoding, or an adapted H.264 encoding method, such as shown in FIG. 6. A rate controller component 704 dynamically adjusts encoder parameters to achieve a target bitrate specified by a bitrate parameter 706. The rate controller 704 allocates a budget of bits to each region, individual picture, group of pictures and/or sub-picture in a video sequence.

Embodiments of the codec pre-processing method can be applied to standard predictive MPEG schemes. In processing a video stream, the MPEG encoder produces three types of coded frames. The first type of frame is called an "I" frame or intra-coded frame. This is the simplest type of frame and is a coded representation of a still image. In general, no processing is performed on I-frames; their purpose is to provide the decoder a starting point for decoding the next set of frames. The next type of frame is called a "P" frame or predicted frame. Upon decoding, P-frames are created from information contained within the previous P-frames or I-frames. The third type of frame, and the most common type, is the "B" frame or bi-directional frame. B-frames are both forward and backward predicted and are constructed from the last and the next P or I-frame. Both P-frames and B-frames are inter-coded frames. A codec encoder may encode a stream as the following sequence: IPBB . . . . In digital video transmission, B-frames are often not used. In this case, the sequence may just consist of I-frames followed by a number of P-frames. For this embodiment, the initial I-frame is encoded as lossless, and all following P-frames are encoded as some fraction of lossless compression and some fraction as no-change.

For most encoders, such as H.264, the optimum encoding suggests that the screen be broken up into regions that are horizontally contiguous rows of macroblocks. This scheme generally requires fewer bits to encode a region using the same parameters, i.e., encode in PCM mode, or skip. This scheme however may lead to the whole image converting from slightly blurred to sharp in the course of transmission, which may be annoying to some users. To minimize this effect, in one embodiment, the screen is divided the screen into regions that are arranged in a tiled pattern or a checkerboard pattern. Multiple modes can be supported and controlled via user input.

In certain implementations, the encoded image could be rendered at full resolution or downscaled to account for the receiver's screen size. In addition, the preprocessing step could be performed on a downscaled image to reduce processing load, save power, and so on.

Although embodiments have been described in relation to the H.264 standard, it should be noted that other similar standards may also be used as the basis for codecs 106 and 108 of FIG. 1. Embodiments can also be directed to variable block-size motion systems with block sizes as large as 16×16 and as small as 4×4, or intermediate sizes, such as, 16×8, 8×16, 8×8, 8×4, and 4×8.

The described systems and methods of implementing transmitter and receiver codecs facilitates the transmission of video data, or data that approximates video, such as scrolling text pages, slideshows, and the like, while maintaining the display quality of high quality image regions, such as fine text. Embodiments are thus suited to applications in which presentations comprising high quality images or text data are transmitted from a device to a monitor or projector for display. The system takes advantage of the fact that, in most video presentation applications, the highest degree of detail is required when only a relatively few number of screen items are changing at any given period of time. During extreme cases in which major portions of the screen are changing at once, the video can be compressed using normal H.264 compression schemes, since increased detail is typically not required at such times.

The embodiments described herein facilitate the use of an existing codec standard to implement digital data transmission using standard commercial devices. Unlike present solutions that are implemented for systems such as wireless HDMI that combine multiple codecs or have a new non-standard codec, the codecs of the present system use a standard that is adapted in such a way that a minimal amount of engineering work is required to implement the changes as well impose only minimal additional processing loads during operation. The change can be implemented as either software or hardware, and if implemented in hardware, only a small amount of additional die is required, and minimal amount of additional power consumption is imposed.

Although embodiments have been described with reference to graphics systems comprising GPU devices or visual processing units (VPU), which are dedicated or integrated graphics rendering devices for a processing system, it should be noted that such embodiments can also be used for many other types of video production engines that are used in parallel. Such video production engines may be implemented in the form of discrete video generators, such as digital projectors, or they may be electronic circuitry provided in the form of separate IC (integrated circuit) devices or as add-on cards for video-based computer systems.

In one embodiment, the system including the GPU control system comprises a computing device that is selected from the group consisting of: a personal computer, a workstation, a handheld computing device, a digital television, a media playback device, smart communication device, and a game console, or any other similar processing device.

Aspects of the system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects of the video stream migration system may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the video stream migration system is not intended to be exhaustive or to limit the embodiments to the precise form or instructions disclosed. While specific embodiments of, and examples for, processes in graphic processing units or ASICs are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the disclosed system in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed embodiments are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventor reserves the right to add additional claims after filing the application to pursue such additional claim forms for other aspects.

What is claimed is:

1. A method of processing video data consisting of a plurality of screen images for transmission from a first device to a second device, comprising:
   dividing, by one or more processors, each screen image into a plurality of regions;
   characterizing, by the one or more processors, each region of the plurality of regions as either high quality or low quality relative to a threshold quality level value that is defined based on one or more parameters including bandwidth limitations of a video processing system, and quality requirements of an application executed by the video processing system, wherein quality of each region is determined by change in each region between consecutive frames by a motion estimation process using motion vectors for defining quality of the regions;
   encoding, by the one or more processors, the low quality regions for compression in accordance with a block-oriented codec standard that is capable of both lossy and lossless compression, wherein the low quality regions are encoded using a normal encoding scheme of a codec; and
   encoding, by the one or more processors, the high quality regions for compression in accordance with a lossless encoding scheme of the codec,
   wherein a high quality region corresponds to at least one of a region with a relatively high degree of change from a first frame to a second frame in consecutive frames of a screen image, or a region containing an area of high contrast between pixels within the region, the high quality region representing a high spatial frequency region, and
   wherein a low quality region corresponds to a region with a relatively low degree of change from a first frame to a second frame in consecutive frames of a screen image.

2. The method of claim 1 wherein the block-oriented codec standard comprises the H.264 standard, also known as MPEG-4 Part 10.

3. The method of claim 2 wherein the threshold quality level between a high quality region and a low quality region is defined by a user of the video processing system.

4. The method of claim 2 wherein a low quality region comprises a region that does not change from a first frame to a second frame in the consecutive frames of the screen image, and wherein blocks within the region are encoded as a no change region by the first device.

5. The method of claim 4 wherein the no change region includes non-changing pixels and a defined subset of changing pixels, and is processed by:
   encoding non-changing pixels using lossy compression;
   encoding changing pixels using lossless compression; and
   for each new frame of the screen images, moving lossless compression regions to a new spatial location.

6. A video processing system comprising:
   a hardware transmitter having a codec with an encoder process, the codec encoder process processing video data consisting of a plurality of frames for transmission from the transmitter, a first codec implemented as a modified H.264 compliant codec and having one or more processors, the one or more processors configured to:
   divide each screen image into a plurality of regions;
   characterize each region of the plurality of regions as either high quality or low quality relative to a threshold quality level value that is defined based on one or more parameters including bandwidth limitations of a video processing system, and quality requirements of an application executed by the video processing system, wherein quality of each region is determined by change in each region between consecutive frames by a motion estimation process using motion vectors for defining quality of the regions;
   encode the low quality regions for compression in accordance with a block-oriented codec standard that is capable of both lossy and lossless compression, wherein the low quality regions are encoded using a normal encoding scheme of the codec; and encode the high quality regions for compression in accordance with a lossless encoding scheme of the codec, wherein a high quality region corresponds to at least one of a region with a relatively high degree of change from a first frame to a second frame in consecutive frames of a screen image, or a region containing an area of high contrast between pixels within the region, the high quality region representing a high spatial frequency region, and wherein a low quality region corresponds to a region with a relatively low degree of change from a first frame to a second frame in consecutive frames of a screen image.

7. The system of claim 6 wherein the block oriented codec standard comprises the H.264 standard, also known as MPEG-4 Part 10.

8. The system of claim 7 wherein a low quality region comprises a region that does not change from a first frame to a second frame in consecutive frames of the screen image, and wherein blocks within the region are encoded as a no change region by a first device.

9. The system of claim 8 wherein the no change region includes non-changing pixels and a defined subset of changing pixels, and wherein the one or more processors is further configured to:

encode non-changing pixels using lossy compression;

encode changing pixels using lossless compression; and for each new frame of the screen images, move lossless compression regions to a new spatial location.

10. The system of claim 7 further comprising a receiver wirelessly coupled to the transmitter, and having a second codec configured to receive and decode the video data, the second codec implemented as a standard H.264-compliant codec.

11. The system of claim 6 wherein a first device is selected from the group consisting of: a mobile computing device, a personal digital assistant, a workstation computer, and a mobile communication device.

12. The system of claim 11 wherein a second device is selected from the group consisting of: a monitor, a projector, and an electronic. tablet.

\* \* \* \* \*